(12) United States Patent
Clark et al.

(10) Patent No.: US 9,370,176 B2
(45) Date of Patent: Jun. 21, 2016

(54) MOLE TRAP AND METHOD OF OPERATION THEREFOR

(71) Applicant: Senoret Chemical Company, Lititz, PA (US)

(72) Inventors: Stewart Clark, St. Louis, MO (US); Leonard A. Ficken, Ballwin, MO (US)

(73) Assignee: SENORET CHEMICAL COMPANY, Lititz, PA (US)

( * ) Notice: Subject to any disclaimer, the term of this patent is extended or adjusted under 35 U.S.C. 154(b) by 196 days.

(21) Appl. No.: 14/157,265

(22) Filed: Jan. 16, 2014

(65) Prior Publication Data

US 2014/0196356 A1 Jul. 17, 2014

Related U.S. Application Data

(62) Division of application No. 12/830,032, filed on Jul. 2, 2010, now Pat. No. 8,640,379.

(51) Int. Cl.
*A01M 23/36* (2006.01)
*A01M 27/00* (2006.01)

(52) U.S. Cl.
CPC ............ *A01M 23/36* (2013.01); *A01M 27/00* (2013.01)

(58) Field of Classification Search
CPC ............................ A01M 23/36; A01M 27/00
USPC ...................................................... 43/77–80
See application file for complete search history.

(56) References Cited

U.S. PATENT DOCUMENTS

| 27,967 | A | * | 4/1860 | Buxton | A01M 23/36 43/79 |
| 78,128 | A | * | 5/1868 | Polley | A01M 23/36 43/80 |
| 119,354 | A | * | 9/1871 | Hardwick | A01M 23/36 43/80 |
| 124,027 | A | * | 2/1872 | Arnold | A01M 23/36 43/80 |
| 126,573 | A | * | 5/1872 | Polley | A01M 23/36 43/80 |
| 150,432 | A | * | 5/1874 | Reed | A01M 23/36 43/80 |
| 210,040 | A | * | 11/1878 | Isbell | A01M 23/36 43/80 |

(Continued)

FOREIGN PATENT DOCUMENTS

| FR | 2838922 | 10/2003 | |
| FR | 2838922 A1 | * 10/2003 | ............ A01M 27/00 |

(Continued)

OTHER PUBLICATIONS

Victorpest, "Mole and Gopher Traps: Instructions for Setting and Baiting," Internet web page, printed Aug. 22, 2006, 4 pages, http://www.victorpest.com/mole_instructions.htm.

*Primary Examiner* — Darren W Ark

(74) *Attorney, Agent, or Firm* — Jacobson Holman, PLLC.

(57) ABSTRACT

A mole trap includes a molded housing with first and second portions. One of the portions includes two molded posts. A trigger and release plate are each pivotally mounted on one of the two posts, and are substantially encased within the housing. The trap may include a first shaft connected to a trigger pad, and a spring loaded second shaft. The first shaft is slideable with respect to the second shaft, which is connected to a plurality of tines. A release is operative to hold a trigger in a set position, and thereby hold the spring loaded second shaft in the set position. The first shaft is operable to displace the release in response to an upward force applied to the trigger pad, wherein the release is operable to release the trigger in response to the displacement, wherein the trigger is operable to release the spring loaded outer shaft.

17 Claims, 11 Drawing Sheets

(56) References Cited

U.S. PATENT DOCUMENTS

| | | | | |
|---|---|---|---|---|
| 217,602 A * | 7/1879 | Fort | A01M 23/36 | 43/80 |
| 223,760 A * | 1/1880 | Rogers | A01M 23/36 | 43/80 |
| 238,583 A * | 3/1881 | Hales | A01M 23/36 | 43/80 |
| 242,208 A * | 5/1881 | Mabbett, Jr. | A01M 23/36 | 43/80 |
| 242,912 A * | 6/1881 | Fort | A01M 23/36 | 43/80 |
| 305,445 A * | 9/1884 | Gilbert | A01M 23/36 | 43/80 |
| 346,218 A * | 7/1886 | Olmsted | A01M 23/36 | 43/80 |
| 351,678 A * | 10/1886 | Williams | A01M 23/36 | 43/80 |
| 374,135 A * | 11/1887 | Wood | A01M 23/36 | 43/80 |
| 374,765 A * | 12/1887 | Waltman | A01M 23/36 | 43/80 |
| 393,048 A * | 11/1888 | Wherry | A01M 23/36 | 43/80 |
| 451,839 A * | 5/1891 | Picard | A01M 23/36 | 43/80 |
| 458,493 A * | 8/1891 | Ricardo | A01M 23/36 | 43/80 |
| 481,585 A * | 8/1892 | Oerther | A01M 23/36 | 43/80 |
| 517,824 A * | 4/1894 | Parham | A01M 23/36 | 248/156 |
| 524,216 A * | 8/1894 | Reddick | A01M 23/36 | 43/80 |
| 540,475 A * | 6/1895 | Wherry | A01M 23/36 | 219/150 V |
| 563,310 A * | 7/1896 | Reger | A01M 23/36 | 43/80 |
| 593,933 A * | 11/1897 | Guertin | A01M 23/36 | 43/80 |
| 631,790 A * | 8/1899 | Griffin | A01M 23/36 | 43/80 |
| 666,212 A * | 1/1901 | Simmons | A01M 23/36 | 43/80 |
| 668,456 A * | 2/1901 | Rittenhouse | A01M 23/36 | 43/80 |
| 670,757 A * | 3/1901 | Barnes | A01M 23/36 | 43/80 |
| 674,551 A * | 5/1901 | Carlsen | A01M 23/36 | 43/79 |
| 680,617 A * | 8/1901 | Quesenberry | A01M 23/36 | 43/80 |
| 687,226 A * | 11/1901 | Gorr | A01M 23/36 | 43/79 |
| 689,324 A * | 12/1901 | Rittenhouse | A01M 23/36 | 43/80 |
| 767,220 A * | 8/1904 | Graeber | A01M 23/36 | 43/80 |
| 778,429 A * | 12/1904 | Steelsmith | A01M 23/36 | 43/79 |
| 788,076 A * | 4/1905 | Swope | A01M 23/36 | 43/80 |
| 820,686 A * | 5/1906 | Walker | A01M 23/36 | 43/80 |
| 861,174 A * | 7/1907 | Heil | A01M 23/36 | 43/80 |
| 898,262 A * | 9/1908 | Renken | A01M 23/36 | 43/80 |
| 954,996 A * | 4/1910 | Renken | A01M 23/36 | 43/79 |
| 964,877 A * | 7/1910 | Nepean-Hutchison | A01M 23/36 | 43/80 |
| 983,181 A * | 1/1911 | Tharp | A01M 23/36 | 43/79 |
| 986,254 A * | 3/1911 | Whitney | A01M 23/36 | 43/80 |
| 993,192 A * | 5/1911 | Ostertag | A01M 23/36 | 43/80 |
| 996,067 A * | 6/1911 | Dierks | A01M 23/36 | 43/79 |
| 1,025,564 A * | 5/1912 | Eldridge | A01M 23/36 | 43/80 |
| 1,026,305 A * | 5/1912 | Eldridge et al. | A01M 23/36 | 43/79 |
| 1,132,697 A * | 3/1915 | Uhlrig | A01M 23/36 | 43/80 |
| 1,330,622 A * | 2/1920 | Corsaw | A01M 23/36 | 43/80 |
| 1,334,418 A * | 3/1920 | Tabor | A01M 23/36 | 43/79 |
| 1,382,125 A * | 6/1921 | Schroeter | A01M 23/36 | 43/80 |
| 1,470,854 A * | 10/1923 | Lively | A01M 23/00 | 43/79 |
| 1,519,113 A * | 12/1924 | Burkhart | A01M 23/00 | 43/6 |
| 1,527,328 A * | 2/1925 | Percich | A01M 23/36 | 43/79 |
| 1,584,677 A * | 5/1926 | Stacy | A01M 23/30 | 43/78 |
| 1,626,903 A * | 5/1927 | Wyman | A01M 23/36 | 43/80 |
| 1,807,463 A * | 5/1931 | Anderson | A01K 69/06 | 43/79 |
| 1,918,582 A * | 7/1933 | Alvau | A01M 23/34 | 43/80 |
| 2,009,635 A * | 7/1935 | Remlinger | A01M 23/36 | 43/80 |
| 2,086,826 A * | 7/1937 | Smith | A01M 23/36 | 248/156 |
| 2,104,083 A * | 1/1938 | Krahl | A01M 23/24 | 43/78 |
| 2,148,813 A * | 2/1939 | Hosmer | A01M 23/24 | 43/78 |
| 2,149,311 A * | 3/1939 | Potts | A01M 23/36 | 43/79 |
| 2,385,875 A * | 10/1945 | Moore | A01M 23/36 | 43/80 |
| 2,475,467 A * | 7/1949 | Alvan | A01M 23/34 | 43/80 |
| 2,507,284 A * | 5/1950 | Sullivan | A01M 23/36 | 43/79 |
| 2,542,942 A * | 2/1951 | Purlee | A01M 23/24 | 43/78 |
| 2,589,385 A * | 3/1952 | Howrey | A01M 23/36 | 43/80 |
| 2,778,148 A * | 1/1957 | Schmidt | A01M 27/00 | 43/80 |
| 3,013,358 A * | 12/1961 | Wilken | A01M 23/36 | 43/80 |
| D270,174 S * | 8/1983 | Gaines | D22/119 | |
| 4,494,335 A * | 1/1985 | Gaines | A01M 27/00 | 43/80 |
| 4,685,245 A * | 8/1987 | LaPier | A01M 23/36 | 43/78 |
| 4,776,128 A * | 10/1988 | Townsend | A01M 23/36 | 43/80 |
| 4,827,662 A * | 5/1989 | Dahlman | A01M 23/34 | 43/86 |
| 6,415,544 B1 * | 7/2002 | Leyerle | A01M 23/24 | 43/82 |
| 6,508,031 B1 * | 1/2003 | Johnson | A01M 23/30 | 43/83.5 |
| 6,802,152 B2 * | 10/2004 | Hagen | A01M 27/00 | 43/78 |
| 7,076,913 B1 * | 7/2006 | Dow | A01M 31/002 | 43/77 |
| 7,779,574 B1 * | 8/2010 | Miller | A01M 27/00 | 43/78 |
| 8,042,299 B1 * | 10/2011 | Brown, Jr. | A01M 23/36 | 43/77 |

(56) References Cited

U.S. PATENT DOCUMENTS

| | | | | |
|---|---|---|---|---|
| 8,640,379 B2 * | 2/2014 | Clark | A01M 23/36 43/77 |
| 2008/0092431 A1 * | 4/2008 | Fritzboger | A01M 27/00 43/79 |
| 2010/0031555 A1 * | 2/2010 | Le Laidier | A01M 23/36 43/77 |
| 2011/0088308 A1 * | 4/2011 | Walsh | A01M 27/00 43/81 |
| 2015/0272108 A1 * | 10/2015 | Relf | A01M 23/30 43/78 |

FOREIGN PATENT DOCUMENTS

| | | | | |
|---|---|---|---|---|
| FR | 2856890 | | 1/2005 | |
| FR | 2856890 A1 * | | 1/2005 | A01M 23/36 |
| FR | 2870672 A1 * | | 12/2005 | A01M 23/36 |
| JP | 2005-095010 | | 4/2005 | |
| JP | 2005095010 A * | | 4/2005 | |
| JP | 2012-005400 | | 1/2012 | |
| JP | 2012005400 A * | | 1/2012 | |
| KR | 200437121 Y1 * | | 11/2007 | |
| WO | WO 2010/022795 | | 3/2010 | |
| WO | WO 2010022795 A1 * | | 3/2010 | A01M 23/36 |

\* cited by examiner

MOLE TRAP AND METHOD OF OPERATION THEREFOR

This is a divisional application of U.S. patent application Ser. No. 12/830,032, filed Jul. 2, 2010, and hereby claims the priorities thereof to which it is entitled.

BACKGROUND

The present disclosure is related to mole traps. Existing mole traps usually have externally exposed components, including the trigger mechanism, that can lead to unwanted tripping of the device by inadvertent contact when the trap is set and installed. The exposed components also increase the danger to children and pets who may wander too close to the device. Exposed mechanisms can also create a danger for the operator when setting the device. Further, mole traps that have spikes or tines above ground level when the trap is set, also create a danger to children and pets. Also, mole traps having various exposed trigger mechanisms can be difficult to set.

DETAILED DESCRIPTION

Figure 1:
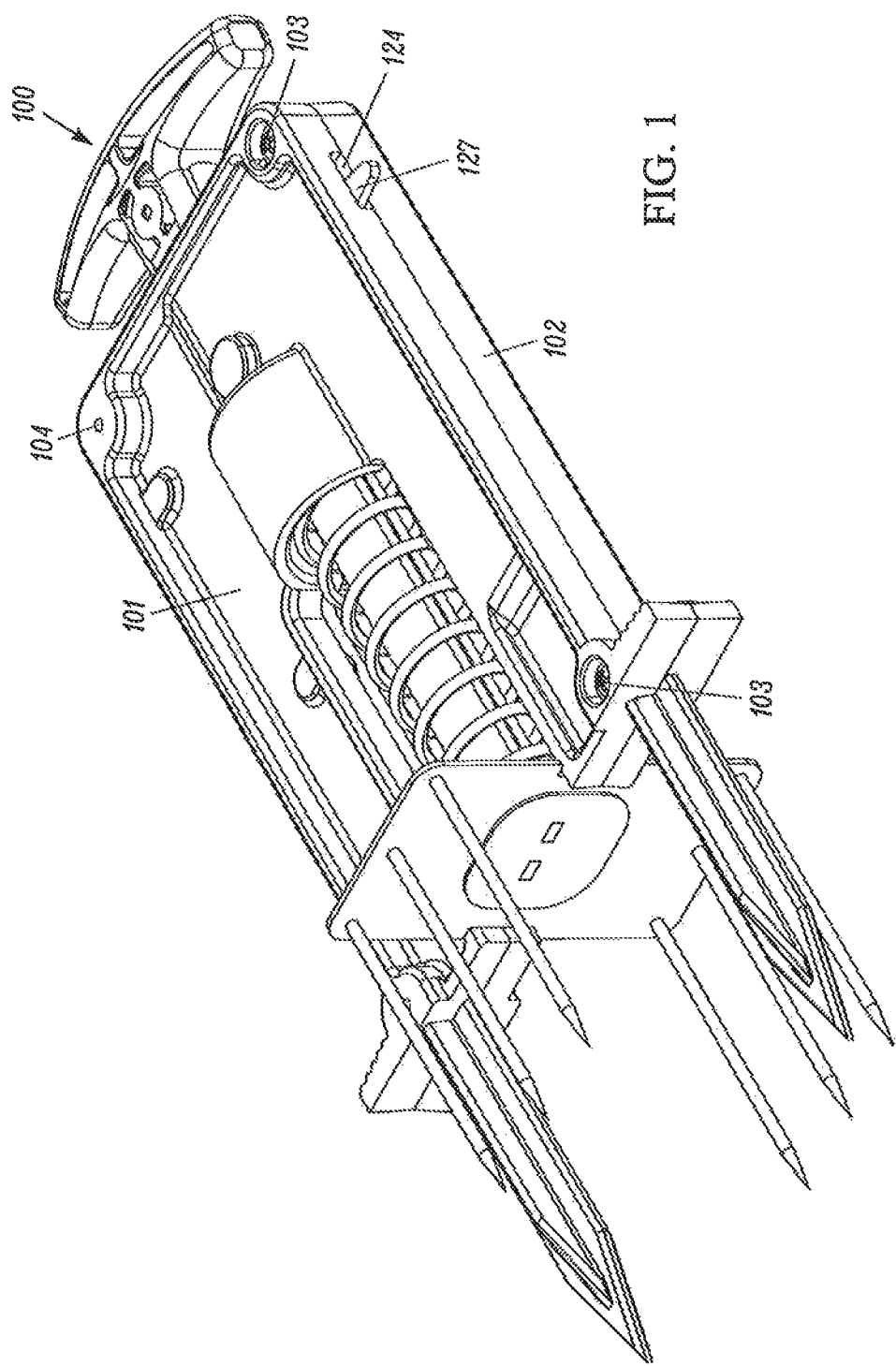
FIG. 1 is a perspective view of a mole trap assembly in accordance with an embodiment.

The present invention is not limited to the particular details of the apparatus depicted, and other modifications and applications may be contemplated. Further changes may be made in the device without departing from the true spirit of the scope of the invention herein involved. It is intended, therefore, that the subject matter in this disclosure should be interpreted as illustrative, not in a limiting sense.

The present disclosure, in one aspect, describes a mole trap that includes a spring loaded tine assembly; a molded housing substantially encasing the spring loaded tine assembly; and a trigger mechanism, substantially encased by the molded housing. The mole trap trigger mechanism is settable to hold the spring loaded tine assembly in a set position and operative to release the spring loaded tine assembly in response to a trigger force applied to the trigger mechanism. Setting the trap is very simple and involves only pulling the spring loaded tine assembly upwardly. Other advantages will be apparent to those skilled in the art.

The mole trap molded housing may include a first molded housing portion and a second molded housing portion which may be, in one aspect, substantially symmetrical to the first molded housing portion. The first molded housing portion and the second molded housing portion may be connected by a plurality of fasteners, that may include threaded fasteners and complementary holes, snap fit connections or the like. In embodiments where the molded housing portions are substantially symmetrical, the molded housing portions may include mating recesses on their internal surfaces for encasing the trigger mechanism.

The mole trap herein disclosed may be operated by pulling upwardly on the tine shaft of a spring loaded tine assembly until a protrusion of a release plate engages the tine shaft; and slightly lowering the tine shaft of the spring loaded tine assembly until an edge of the body engages and rests within a trigger slot. That is, a tine body surface rests against a bottom portion of a slot within a trigger lever. A protrusion of a release plate rests adjacent the upper end of a first shaft that is attached to the trigger pad. The mole trap is initially installed in the ground by positioning two ground spikes into the ground on opposite sides of a mole tunnel such that the mole trap straddles the mole tunnel, and such that the trigger pad of the mole trap contacts the ground surface on top of the mole tunnel.

In one embodiment herein disclosed, a mole trap has a molded housing including a first molded housing portion and a second molded housing portion, wherein at least one of said first and second housing portions includes at least two molded posts; and a trigger and a release plate, each being pivotally mounted upon one of the at least two molded posts. The trigger and the release plate are substantially encased within the molded housing. The mole trap molded housing portions may also each include fasteners, that may include threaded fasteners and complementary holes, snap fit posts and snap fit holes or the like, such that the first molded housing portion may be connected to the second molded housing portion to assemble the molded housing.

The trigger and the release plate may each include a post hole such that the trigger is pivotally mounted by sliding the trigger post hole over one of the two molded posts. Similarly, the release plate is pivotally mounted by sliding the release plate post hole over one other of said at least two molded posts. Among other advantages, no additional hardware is required to mount the trigger and release plate within the molded housing. The release plate has a portion positioned such that a change in the pivotal position of the release plate causes the release plate to release the trigger such that the trigger also pivots to release a spring loaded tine assembly. The release plate may also include a biasing element connected thereto for selective engagement with the trigger to bias into an unset position and to help unlatch when triggered.

In some embodiments, the mole trap internal area of at least one of the first molded housing portion and the second molded housing portion includes recesses for encasing the trigger and the release plate so that the trigger mechanism is not exposed. Recesses may also be provided to receive a spring loaded shaft of the spring loaded tine assembly.

The mole trap molded housing also provides an archway and/or cup configured to allow a spring loaded shaft to be placed in a set position when a compression spring is placed in a compressed position and such that the spring loaded shaft is operable to move longitudinally within the archway as the trap is sprung.

The first molded housing portion and the second molded housing portion may be substantially symmetrical or substantially identical in some embodiments.

A mole trap in accordance with one embodiment may include a first shaft and a spring loaded second shaft. The first shaft is connected to a trigger pad and is slideable with respect to the spring loaded second shaft. The spring loaded second shaft is connected to a plurality of tines. The mole trap also includes a release and a trigger, wherein the release is operative to hold the trigger in a set position. The trigger is in turn operative to hold the spring loaded second shaft and the plurality of tines in the set position. The first shaft is operable to displace the release in response to upward force applied to the trigger pad, and the release is in turn operable to release the trigger in response to the displacement. The trigger is operable to release the spring loaded second shaft which drives the plurality of tines into the mole burrow. The mole trap embodiment may include a molded housing substantially encasing the release and the trigger. Only a test tab, which is actually a portion of the release plate, may protrude through a slot of the molded housing when the trap is in a sprung or set position. The user pushes the test tab downwardly when testing the trap in the set position.

The mole trap molded housing may include first and second molded posts internal to the molded housing, where the release is pivotably mounted on the first molded post, and where the trigger is pivotably mounted on the second molded post. The molded housing may consist of a first molded housing portion and a second molded housing portion connected together by a plurality of fasteners, including threaded fasteners and complementary holes, snap fit connections or the like.

In some embodiments, the first molded housing portion and the second molded housing portion may be substantially symmetrical. Further in some embodiments, the first molded housing portion and the second molded housing portion may be identical.

In some mole trap embodiments, the release includes a protrusion that is operative to engage an upper end of the first shaft when the trap is in the set position. The first shaft is operable to displace the release by sliding upwardly with respect to the second shaft to displace the protrusion by pushing it upwardly in response to pressure upon the trigger pad. The release may also include a recess for engaging, and holding in place, the trigger when the mole trap is in the set position. The release is thereby operable to pivot in response to displacement of the first shaft, and thereby displace the slot to release the trigger.

The trigger includes a trigger slot for holding the spring loaded second shaft in the set position. The trigger also has a portion fitted to engage the recess of the release, so that it may be held in place by the recess of the release when the trap is in the set position. The trigger is pivotable in response to displacement of the release, and the trigger pivoting action releases the spring loaded second shaft, when displacement of the release disengages the trigger from the slot of the release or when the test tab is actuated.

The embodiments disclosed also provide a method of operating a mole trap, which includes pulling upwardly on a spring loaded shaft and tine assembly; and lowering the spring loaded shaft and tine assembly until a portion thereof engages in a slot of a trigger and is held in a set position thereby.

It is to be understood that terms used herein such as "first," "second," "left," "right," "upper," "lower," etc., are relational terms useful for describing the position or location of various components relative to others and that this language is used herein for such descriptive purposes only and is not to be in any way considered as imposing limitations on the various embodiments herein described. Further the terms "operable to" and/or "operative to" as used herein, particularly as used within the claims appended hereto, indicate that the various components of the mole trap herein described may be positioned, or, in other words, set, in a "trap set" or sprung to be in a "trap sprung" for "tripped") position. That is, the various components are each "operative to" or "operable to" be set or sprung and/or, to operate so as to interact with various other components as described in detail herein.

Turning now to the drawings, wherein like numerals represent like components, FIG. 1 is a perspective view of a mole trap assembly 100 in accordance with an embodiment. The mole trap assembly 100 may include a housing which comprises a first trap housing portion 101 and a second trap housing portion 102. Preferably each of the two trap housing portions includes a plurality of fasteners, including, but not limited to, threaded fasteners, snap fit connections, such as snap fit posts and snap fit holes for receiving the snap fit posts from the opposite trap housing portion, and the like. For example, first trap housing portion 101 may include a plurality of threaded fasteners 103 and holes 104 configured to receive the threaded fasteners 103. The holes 104 may be threaded or unthreaded depending on the type of threaded fastener specified. Alternatively, various snap fit embodiments may be employed and such embodiments may use, for example, square or rectangular snap fit apertures and corresponding two-section snap fit posts. Other snap-fit embodiments may employ cylindrical snap-fit posts and circular snap fit apertures, etc. Other embodiments may employ screw and nut assemblies for attaching the two trap housing portions. The housing may be fabricated from, for example, any suitable molded plastic material or similar material of construction.

Figure 2:
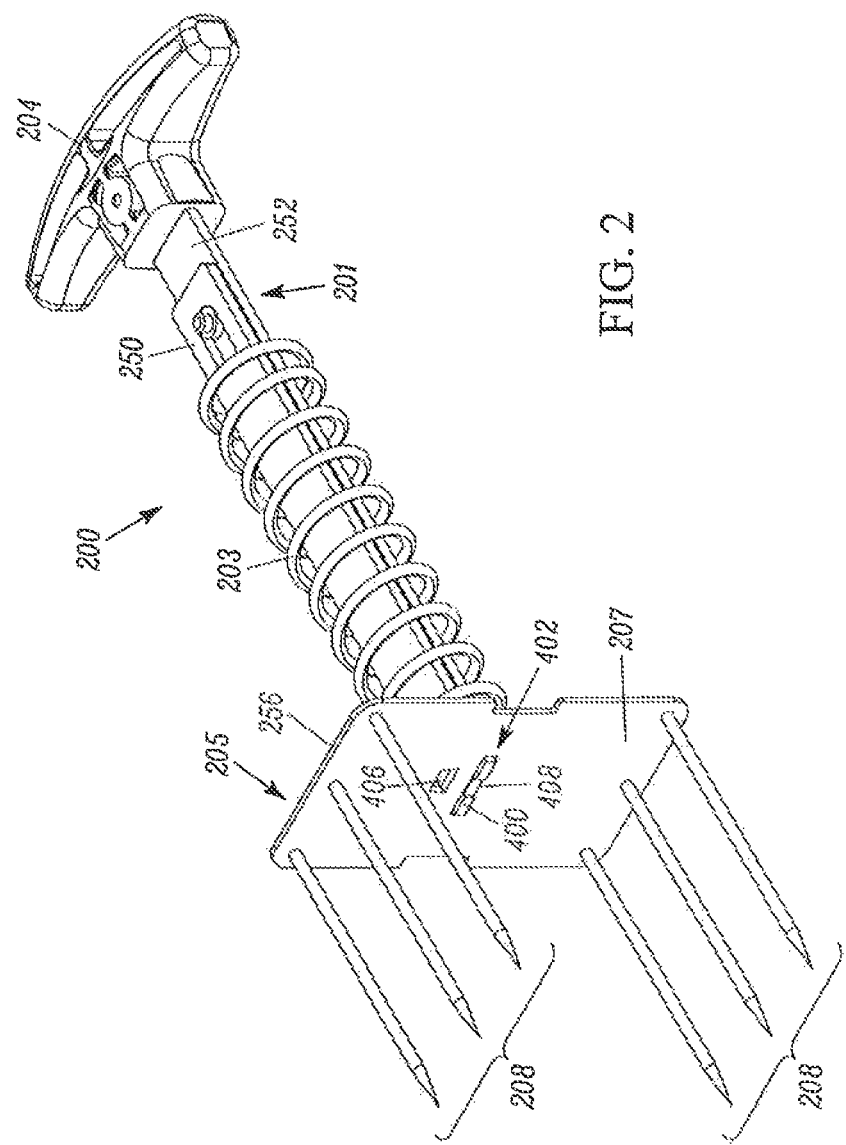
FIG. 2 is a perspective view of a tine assembly portion of the mole trap assembly illustrated in FIG. 1.
Figure 3:
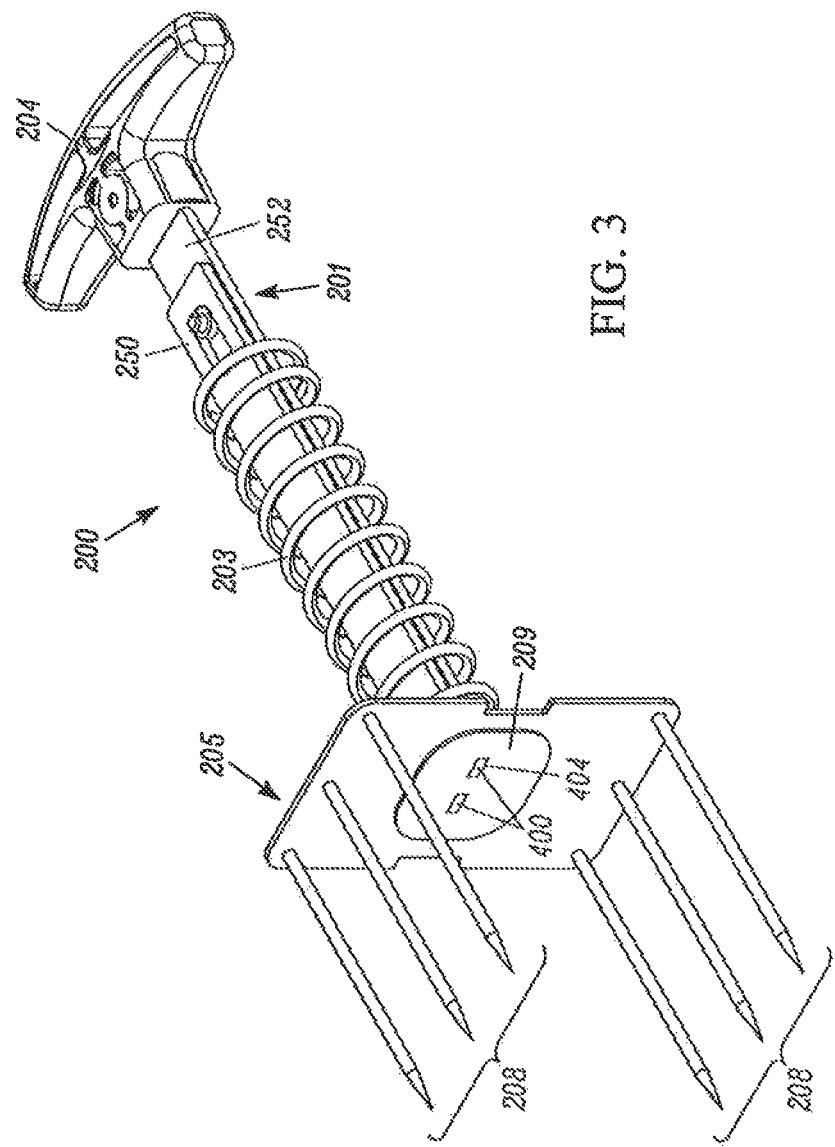
FIG. 3 is a perspective view of the tine assembly portion illustrated in FIG. 2, further including a trigger pad, in accordance with the embodiments.

FIG. 2 and FIG. 3 are perspective views of a tine assembly 200 which is installed in the overall mole trap assembly 100 shown in FIG. 1. The tine assembly 200 includes a tine shaft 201 which may be connected, such as by welding, bonding, adhesive, or mechanical fasteners, etc., to a tine body 205. The tine shaft 201, in the various embodiments, may have any suitable cross-section such as, but not limited to, a cross like cross-section, a circular cross section, a square cross section, a rectangular cross section, a c-channel or u-channel cross section, etc. In one embodiment, the tine shaft 201 may include a first shaft 250 and a spring loaded second shaft 252 that are disposed for relative slidable movement and engagement along generally collinear longitudinal axis. Preferably, in one embodiment, the first shaft 250 may be configured to have a series of posts 400 or a crenelated lower end 402 such that projecting portions engage apertures 404 defined in the trigger pad 209 in order to facilitate connection of the first shaft 250 to the trigger pad 209 in any suitable manner such as welding, bonding, mechanical connection, brazing or the like. Additionally, second shaft 252 may be configured to have an "L" shape wherein the commonly understood vertical portion of the "L" is disposed such that the "foot" of the "L" extends away from the first shaft 250, as shown in FIGS. 2 and 3, such that the second shaft 252 may have a second foot 256. One of skill in the art will recognize that the "L" shape may be formed from an integral element or a plurality of elements connected in any suitable manner, such as by welding, brazing, adhesives, mechanical fasteners or the like. Preferably, the second shaft 252 by way of the second foot 256 is connected in any suitable manner to an upper surface of the tine body surface 207, such as, welding, bonding, mechanical connection, brazing or the like. A compression spring 203 is slid over the tine shaft 201 during assembly, prior to installation of the pull handle 204 and/or the tine body 205 such that the compression spring may be slid onto the tine shaft 201. The pull handle 204 may be any suitable handle type, for example, a wire formed handle or a handle of the type illustrated in FIG. 2 and FIG. 3, or the like, and may be permanently or removably connected to the second shaft 252. The tine body 205 includes a plurality of tines 208 and also has a tine body surface 207 which may come into contact with or be disposed adjacent to but not in contact with a trigger pad 209 when the trap is sprung. Turning to FIG. 3, the tine assembly 200 is shown further having a trigger pad 209 connected to first shaft 250. The trigger pad 209 upper surface may contact a lower or bottom surface of the tine body surface 207 when the trap is in a sprung or tripped position, but in another embodiment may only be disposed adjacent to but not in contact with the trigger pad 209. The trigger pad 209 is further connected to the first shaft 250 that is visible in FIG. 3. The first shaft 250 is operable to slide with respect to the second shaft 252. In one embodiment, the tine body surface 207 may include a tab 406 disposed adjacent an aperture 408 defined in the tine body surface 207 through which the first shaft 250 may extend. Preferably, the tab 406 is formed from the tine body surface 207 and may be formed by a punch process or other suitable method. One of skill in the art will recognize that the tab 406 prevents the spring from rubbing on the first shaft 250. The first shaft 250 may have any suitable cross-section in the various embodiments provided that it easily slides with respect to the second shaft 252. The uppermost end of the first shaft 250 is configured for purposes of activating the trigger mechanism as will be described further herein. The trigger pad 209 may be attached to the inner shaft 250 either by welding, binding, adhesives or mechanical fasteners in the various embodiments.

Figure 4:
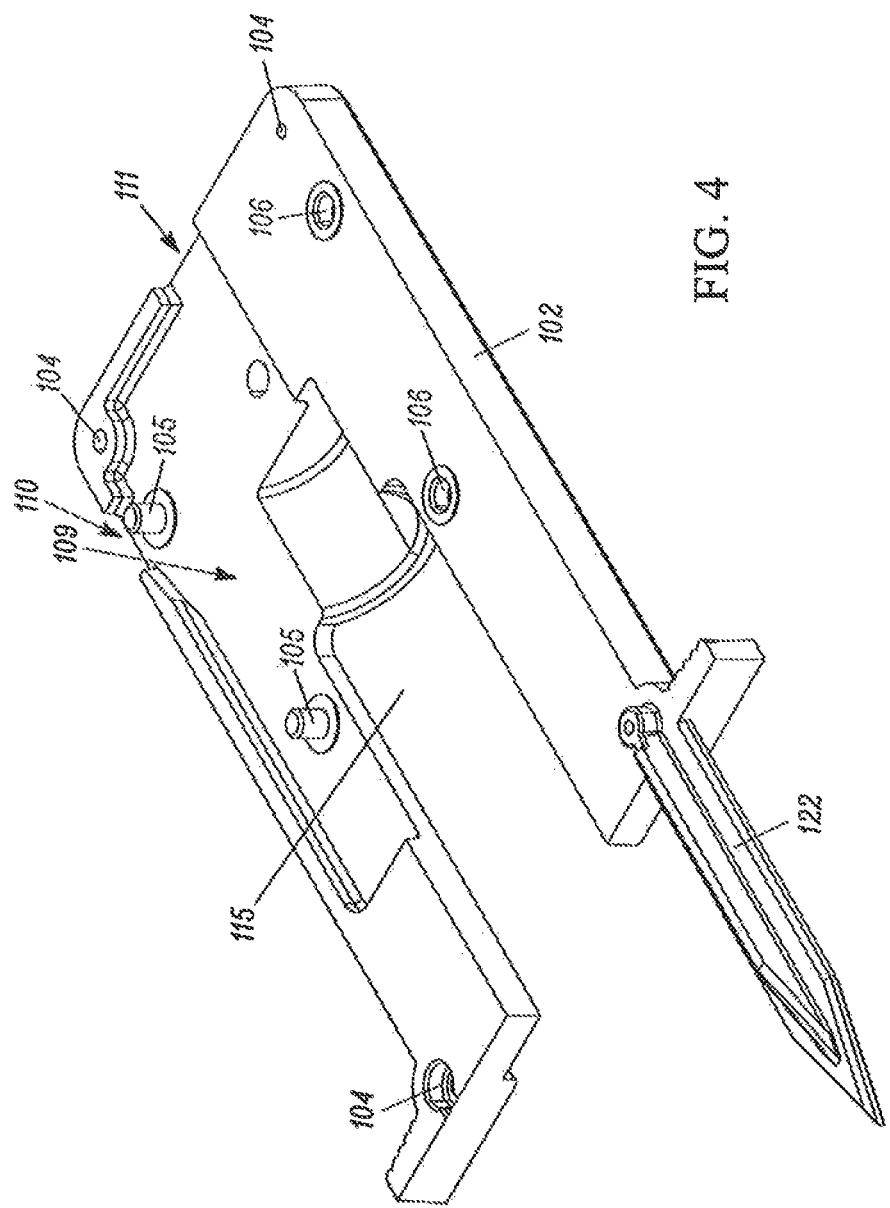
FIG. 4 is a perspective view of a mole trap housing portion m accordance with an embodiment.

FIG. 4 is a perspective view showing details of an embodiment of the second trap housing portion 102. In most embodiments, the first trap housing portion 101 and the second trap housing portion 102 are symmetrical and identical and may form two symmetrical housing halves in some embodiments. Therefore, FIG. 4 may be generally considered as showing either the first trap housing portion 101 or the second trap housing portion 102. Therefore, in FIG. 4, the second trap housing portion 102 is shown disconnected from the first trap housing portion 101. Those skilled in the art will appreciate the manufacturing advantage of embodiments having two symmetrical or identical housing portions because only one mold need be utilized.

Figure 5:
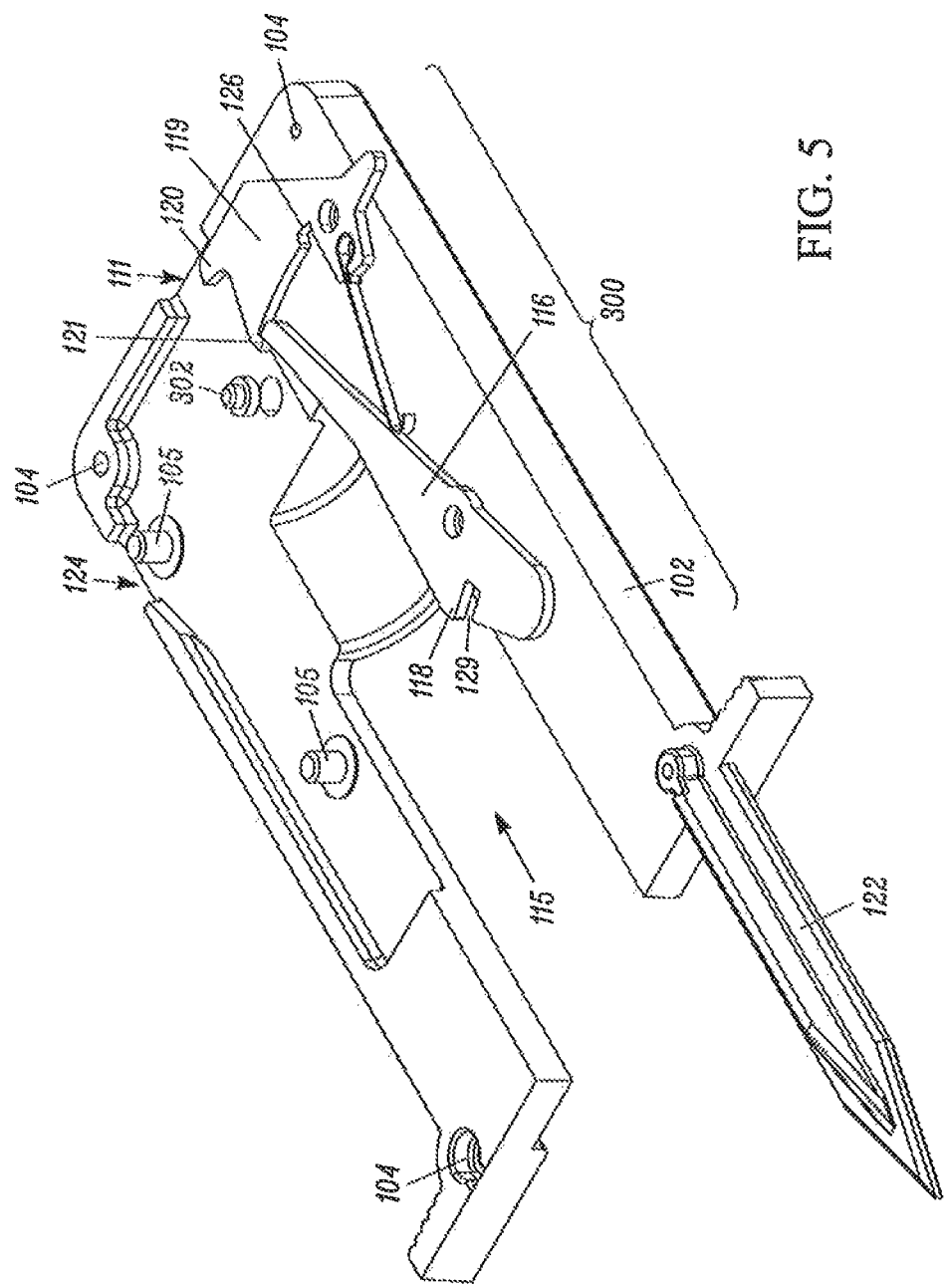
FIG. 5 is a perspective view of the mole trap housing portion illustrated in FIG. 4, with the trigger mechanism installed, in accordance with an embodiment.

For the embodiment illustrated in FIGS. 4 and 5, the second trap housing portion 102 is symmetrical to the first trap housing portion 101. The second trap housing portion 102 includes a plurality of holes 104 formed in bosses formed on the housing or in the housing itself. The holes 104 are for receiving and engaging fasteners as described herein. The second trap housing portion 102 also includes alignment or pivot posts 105 and corresponding complementary post holes 106. These posts may be used to mount components of the trigger mechanism as will be described further herein. The posts may be molded posts that are integrally molded and part of the molded housing portions. However, the posts may also be dowel pins in some embodiments and may be made of some other material, such as, but not limited to, stainless steel, that are connected to the housing in any suitable manner, such as press-fit or other suitable mechanical connection.

The second trap housing portion 102 also includes recesses that may be symmetrical or identical to, and match up with, recesses within the first trap housing portion 101. That is, the recesses are matched up when the first trap housing portion 101 and second trap housing portion 102 are fit together. For example, the first trap housing portion 101 may further include a trigger recess 109. It may also include an opposite side trigger recess 110. As will be described further, the trigger mechanism 300 may be installed on either the second trap housing portion 102 or on the first trap housing portion 101 since both portions are symmetrical or identical as described herein. For the present example, the trigger mechanism 300 is shown installed on the second trap housing portion 102. The trigger recess 109 and side trigger recess 110 are formed on the first trap housing portion and substantially encase the trigger mechanism. The second trap housing portion 102 further includes a tine shaft recess 111. The second trap housing portion 102 also includes an archway 115 wherein the tine assembly 200 may move between a set and sprung position. It is to be understood however that some embodiments may not have symmetrical and identical housing portions. For example, some embodiments may provide all recesses, such as the trigger recess 109, in only one portion, while the other portion of the housing seals the recesses when the two portions are joined and assembled.

FIG. 5 provides another perspective view of the second trap housing portion 102 having further components of the trigger mechanism 300 installed. Also shown in FIG. 5 is a first ground spike 122. The trigger mechanism 300 includes the trigger 116, which may be formed as a bar or lever as shown, and which may be installed over a post 105 (i.e. when the first trap housing portion 101 is connected to the second trap housing portion), which post may be used to also connect the two housing portions together, such as, for example, snap fit posts in some embodiments. Other embodiments may provide a separate post 105 as shown, that is not a snap fit post, for mounting the trigger 116 and also a release plate 119. The post 105 thus serves to provide a trigger pivot 117, and another post 105 provides a pivot for the release plate 119. The trigger 116 includes the trigger tab 118 which is above a trigger slot 129 which is used to hold the tine body 205 in position on a lower surface of the slot 129 when the mole trap is set. Also forming part of the trigger mechanism 300, is the release plate 119, which may also be mounted on a snap fit post, or on a dedicated release plate mounting post 105, as shown. The release plate 119 includes a release plate upper tab 120, which is a protrusion that will engage the upper end of the first shaft 250 when the trap is set. The release plate 119 also has a lower tab 121, and a release plate recess 126 (best viewed in FIG. 8) which is sized to fit the upper end of the trigger 116. The release plate 119 may rotate or pivot about its mounting post 105. When in the sprung position, the release plate 119 may partially extend through a release plate slot 124 which is a cut out section of one, or both, of the first and second trap housing portions 101 and 102. Those of ordinary skill will appreciate the advantages of the trigger mechanism in that the components may be easily fabricated and installed in the housing without tools since they are simply installed over molded posts within the housing.

Figure 6:
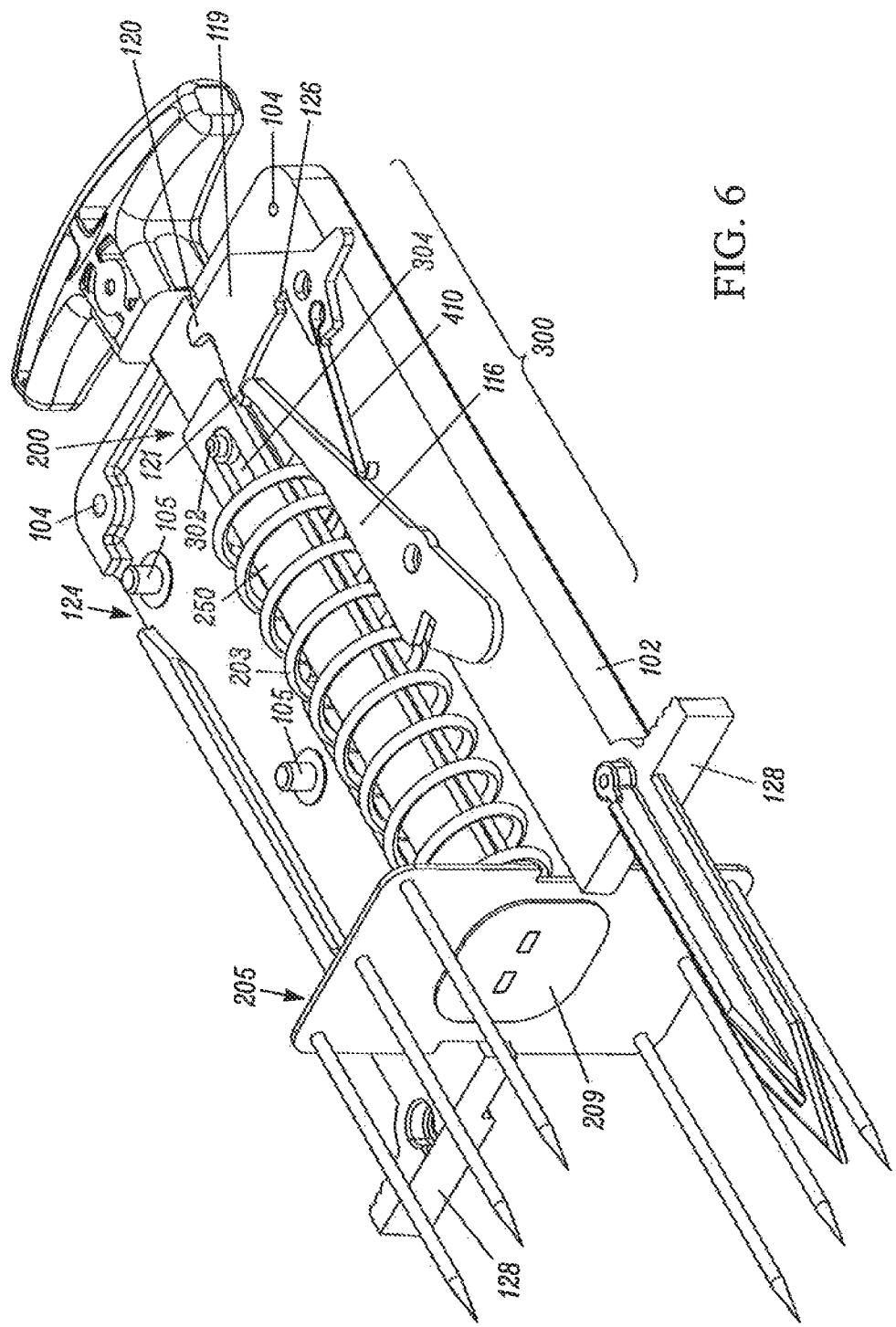
FIG. 6 is a perspective view of the mole trap housing portion illustrated in FIG. 5, with the tine assembly installed, in accordance with an embodiment.

In one embodiment, another post 302 is connected to the first trap housing portion 101. As shown in FIGS. 5 and 6, post 302 is configured to engage a slot 304 formed in the first shaft 250 when connected to the first trap housing portion 101 (which is not shown here, but as explained above is substantially symmetrical to the second trap housing portion 102, except that the post 302 need only be formed on one of the housings or as a separate piece if substantially symmetrical housing portions are desired, and for the purposes of this discussion will be assumed to be disposed as shown in FIG. 1). One of skill in the art will recognize that the cooperation of the post 302 and slot 304 control the range of permitted movement of the first shaft 250 with respect to the second shaft 252. Such range of permitted movement is sufficient to provide the desired functionality as described further herein.

Figure 7:
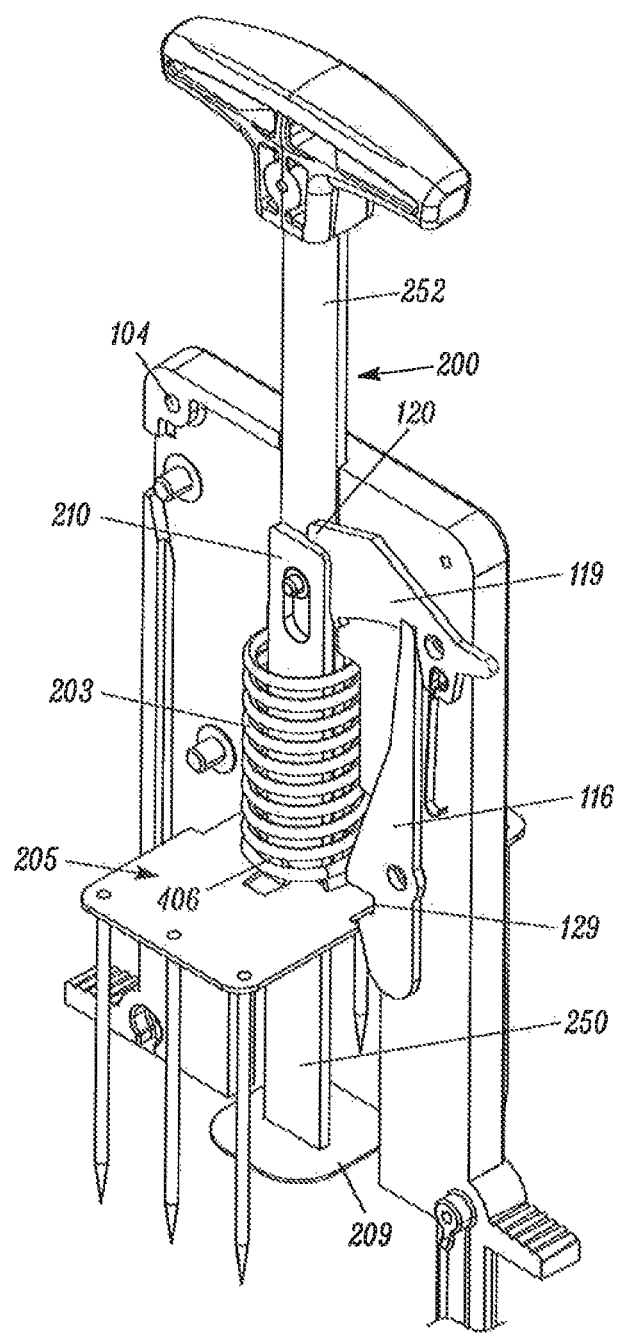
FIG. 7 is perspective view showing details of the trigger mechanism in a set position, in accordance with an embodiment.
Figure 8:
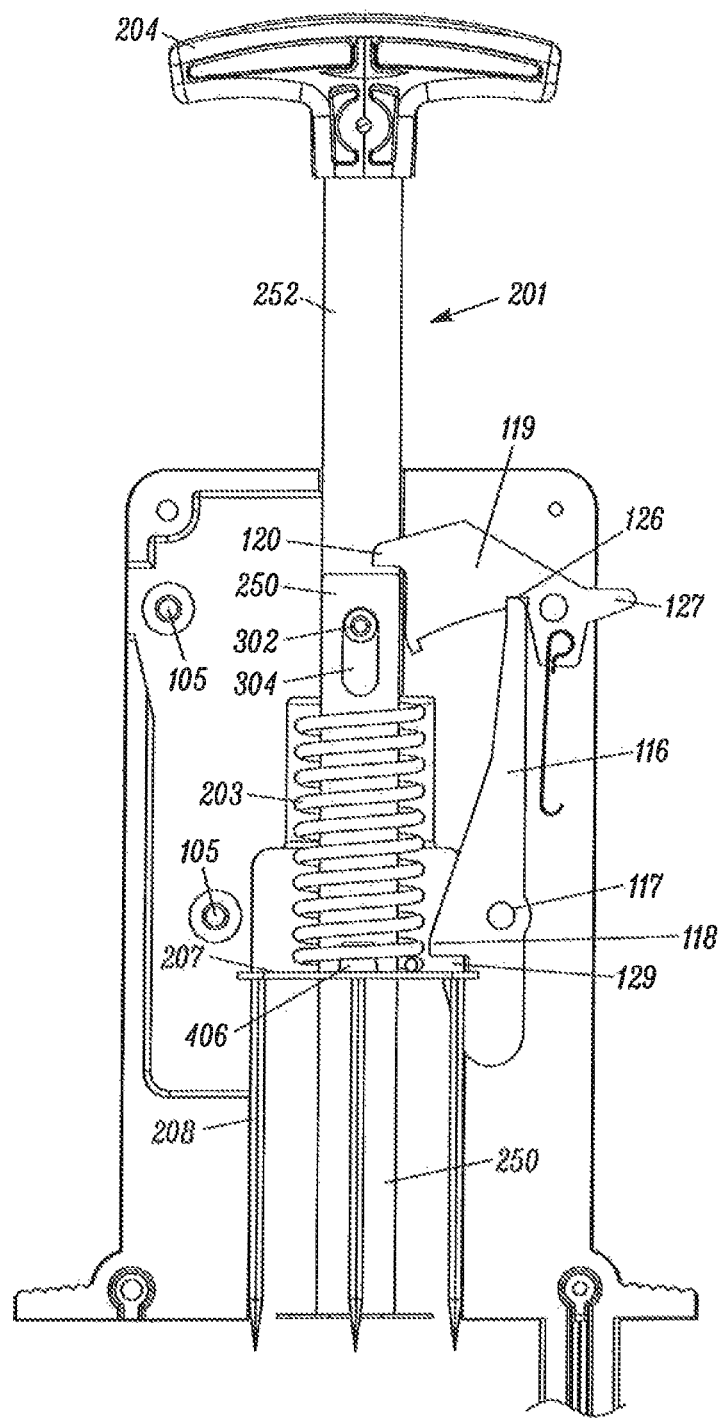
FIG. 8 is a cutaway view showing further details of the trigger mechanism in a set position as shown in FIG. 7.

FIG. 6 is a perspective view of the second trap housing portion 102 having the tine assembly 200 installed. In FIG. 6, the tine assembly 200 is shown in a sprung position. The trigger pad 209 bottom surface is relatively flush with the bottom surface of each trap foot 128 of the two trap feet 128. The trigger 116 and release plate 119 are also illustrated in a released or sprung position. As can be seen in FIG. 6, the release plate lower tab 121 serves to catch the tripped trigger 116 and prevents it from engaging the tine assembly 200. Additionally, a biasing element 410 biases the trigger 116 toward the lower tab 121 in this position to prevent the trigger 116 from being accidentally set, such as when the trap might be inverted as a result of gravity. As a result, the trigger 116 is normally biased into an unset or sprung position. The biasing element 410 may be any suitable apparatus, device, element or structure to provide the necessary functionality. For example, the biasing element 410 may be a leaf spring (as shown), a coil spring, a resilient member or the like. FIG. 7 and FIG. 8 show further details useful for understanding the operation of the trigger mechanism 300.

In FIG. 7 and FIG. 8, the tine assembly 200 is placed in a set position and held in place by the trigger 116 trigger slot 129. The release plate upper tab 120 rests upon the top surface of the first shaft 250, and a release plate recess 126 locks and holds in place the upper end of the trigger lever 116. The force of the biasing element 410 has been overcome and may now no longer engaging the trigger 116. The tine body surface 207 rests against the bottom surface of the trigger slot 129 which supports the tine assembly 200 against the force of the compressed compression spring 203. The trigger pad 209 and first shaft 250 may move freely upwardly when upward pressure is applied, for example, by the mole pushing up on the upper surface of its burrow and thereby contacting, and applying an upward force upon the trigger pad 209. The upward force against trigger pad 209 moves the first shaft 250 upward until it moves and displaces the release plate upper tab 120. This upward pressure, which results in the first shaft 250 displacing the release plate upper tab 120, causes clockwise rotation of the release plate 119 which in turn causes the release plate recess 126 to rotate and release the upper end of the trigger lever 116. The trigger lever 116 thereafter pivots around the trigger pivot 117 causing the trigger slot 129 to tilt, thereby releasing the tine body from engagement with the trigger slot 129. The tine body 205 is therefore forced downward, into the mole tunnel, by the compression spring 203 expansion force.

Figure 9:
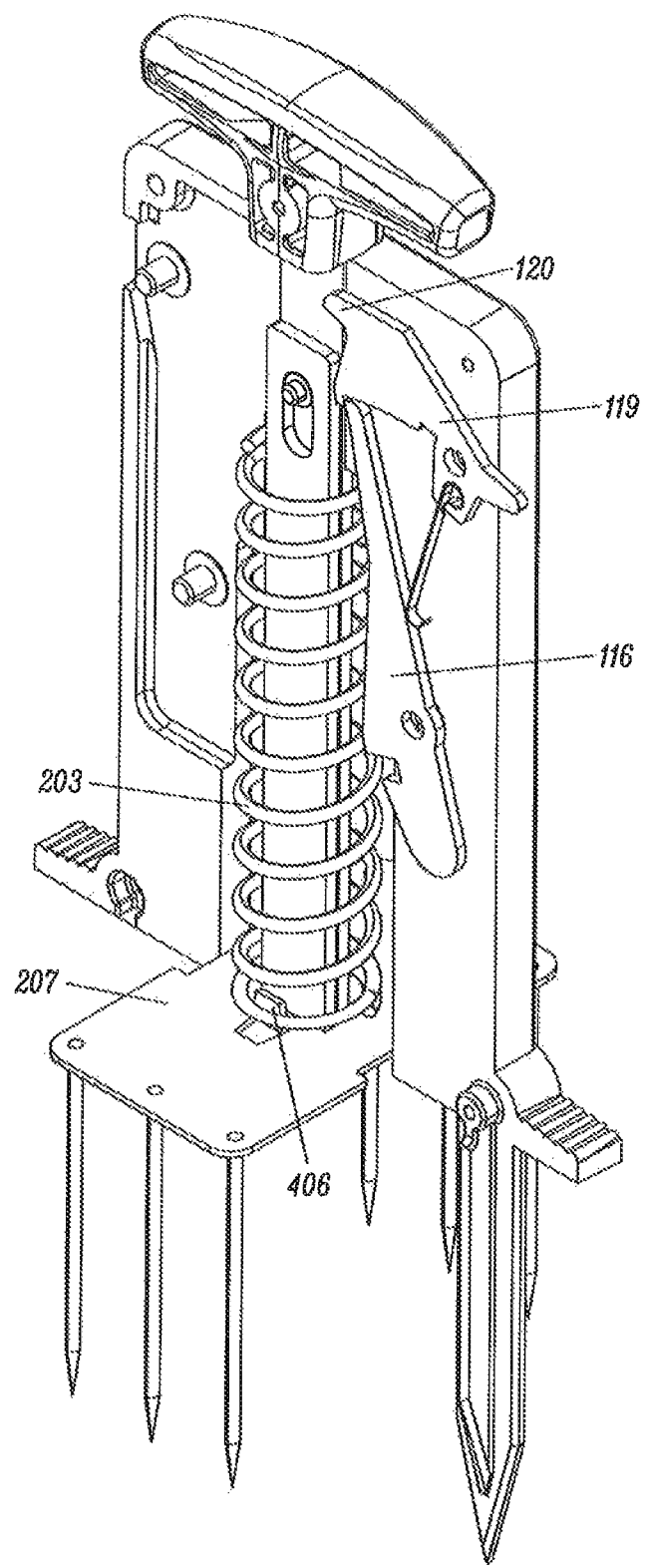
FIG. 9 is a perspective cutaway view showing further details of the trigger mechanism in a sprung position.

FIG. 9 is a perspective cutaway view showing further details of the trigger mechanism in a sprung position where the trigger lever 116 has tilted and released the tine body 205 from the trigger slot 129. In doing so, the biasing element 410 engaged trigger 116 and facilitated the unsetting or springing of the trigger mechanism. As shown in FIG. 9, the tine body surface 207 may come into contact with the upper surface of the trigger pad 209 or may be disposed adjacent thereto when the trap is sprung.

Figure 10:
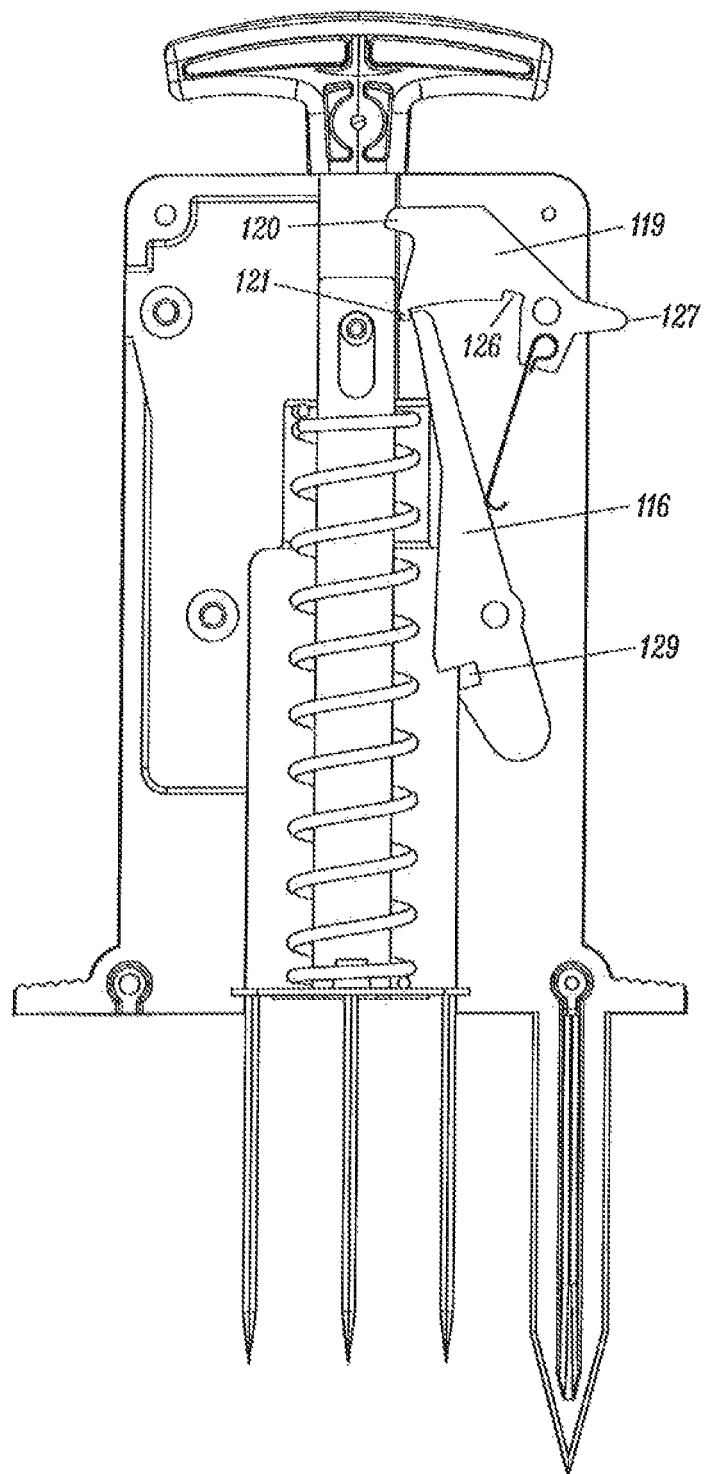
FIG. 10 is a cutaway view showing further of the trigger mechanism in a sprung position as shown in FIG. 9.

FIG. 10 is a cutaway view showing further details of the trigger mechanism in a sprung position as shown in FIG. 9. As can be seen, the release plate lower tab 121 serves to catch the end of the trigger 116 and prevents the trigger 116 from coming into contact with the moving tine assembly 200 during operation of the trap.

Figure 11:
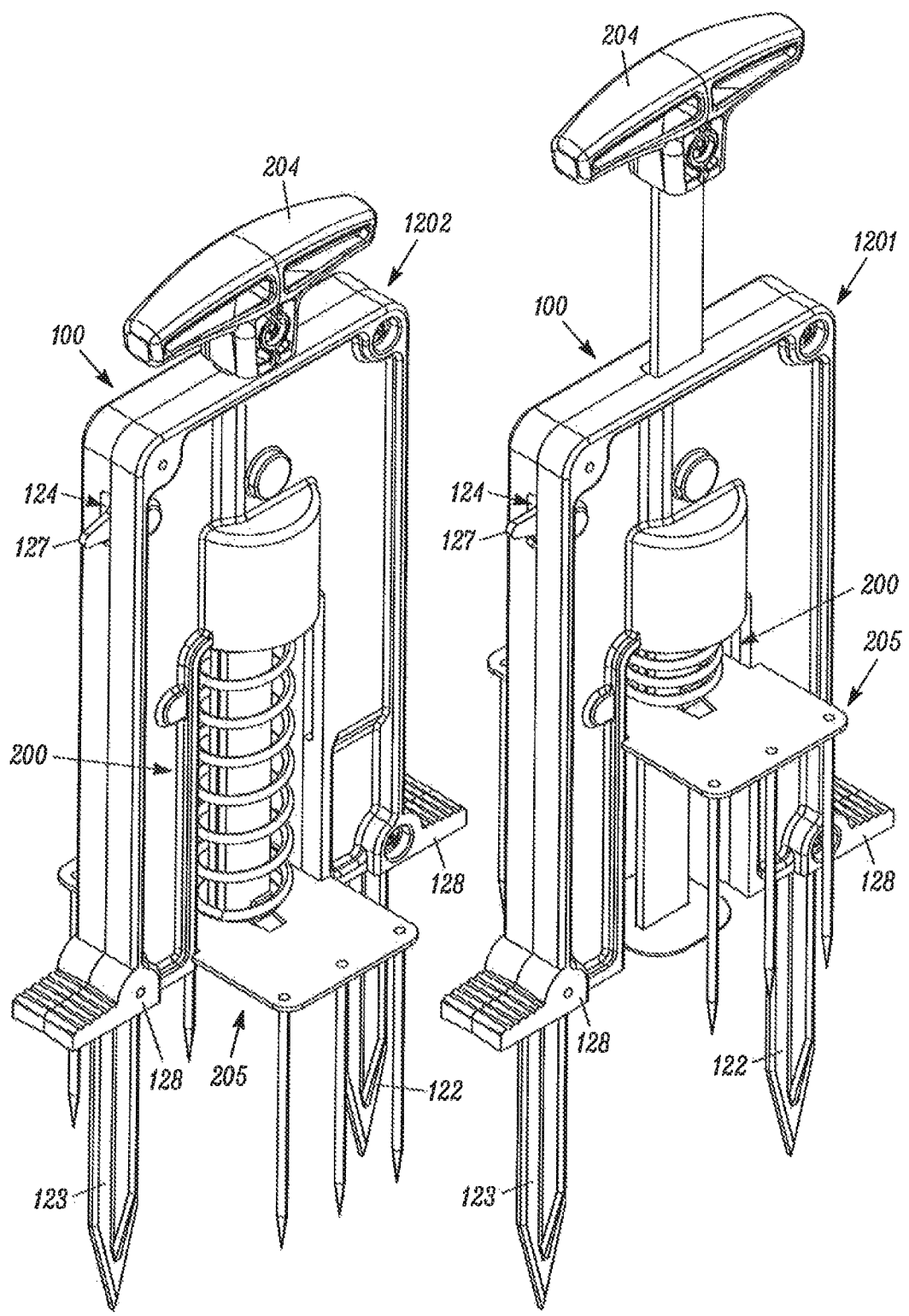
FIG. 11 is a perspective view of the mole trap assembly illustrated in FIG. 1, in a set position and in a sprung position.

FIG. 11 is a perspective view of the mole trap assembly 100 in a set position 1201 and a sprung position 1202. The mole trap assembly 100 is placed in a set position by pulling upwardly on the pull handle 204 and locking the tine assembly 200 in place as was discussed above. That is, the trap is set when the tine body 205 is engaged in the trigger slot 129 and held in place. The trigger lever 116 is held at its upper end by the release plate recess 126 of the release plate 119. The mole trap assembly 100 is placed in the sprung position when the mole pushes upwardly on the trigger pad 209 causing the release plate 119 to be displaced and to rotate clockwise thereby releasing the trigger lever 116, and ultimately releasing the tine assembly 200. The compression spring 203 then forces the tine body 205 into the mole tunnel. As would be understood, the ground spike 122 and ground spike 123 are placed across the mole's tunnel and the bottom surfaces of the mole trap feet 128 are pushed downwardly until they contact the ground. The trigger pad 209 must also make contact with the upper surface of the mole tunnel. In some cases, the location of the mole tunnel where the mole trap assembly 100 is to be installed may be slightly compressed down by pushing upon the top surface of the mole tunnel with the operator's fingers prior to installation of the mole trap assembly 100. The trap is then installed over the tunnel such that the trigger pad 209 is in contact with the ground surface forming the top of the tunnel, and the trap feet 128 also make contact with the ground to stabilize the trap. The operator may also pre-form the holes for the tines 208 by moving the tine assembly 200 up and down several times, and thus pushing the tines 208 into the ground to pre-form tine holes, prior to setting the mole trap. The mole trap may then be set by the user pulling on pull handle 204 upwardly and engaging tine body 205 with the trigger slot 129, and engaging the release plate 119 release plate upper tab 120 onto the first shaft 250 by using the test tab 127. The release plate notch 126 engages and holds the upper end of the trigger lever 116 and locks it in place. The user only needs to place a finger or thumb upon the test tab 127 to push it downwardly, within the release plate slot 124. Pushing the test tab 127 downwardly causes the release plate upper tab 120 to be positioned to engage the upper end of the first shaft 250 when the tine shaft 201 is pulled upwardly. Therefore, setting the mole trap is a simple operation.

The mole trap embodiments described above provide various advantages for manufacturing that would be readily apparent to those of ordinary skill. For example, the components of the trigger mechanism 300 may be easily fabricated by die-cutting etc. Mounting of the trigger and release plate is fast and easy because these components are simply fit over a plastic mounting post, or a dowel pin, of the housing which requires no tools. Additionally, for embodiments employing snap fit connections, no tools are required to assemble the mole trap housing. As discussed above, setting the trap is also simple and involves only the pushing of the test tab 127 and pulling the pull handle 204 upward. Because the trigger mechanism is enclosed in the housing, the user's fingers are in no danger of becoming entangled or pinched by the mechanism or by inadvertent tripping of the trap. Therefore, the mole trap of the various embodiments provides a safety advantage over previous designs.

Therefore a mole trap and method of operation have been disclosed herein. Other variations that would be equivalent to the herein disclosed embodiments may occur to those of ordinary skill in the art and would remain in accordance with the scope of embodiments as defined herein by the following claims.

What is claimed is:

1. A method of operating a mole trap that includes a spring loaded shaft and tine assembly including a first shaft and a second shaft, a housing and a trigger, said first and second shafts being in slidable engagement with one another and generally parallel with one another, said second shaft being slidably movable with respect to said first shaft, the method comprising:
    pulling upwardly on the spring loaded shaft and tine assembly of the mole trap to move the second shaft upwardly with respect to the first shaft, a lower end of the second shaft having a tine body with a plurality of tines that are pulled upwardly with said second shaft;
    pushing a test tab which protrudes through a slot in the housing of the mole trap; and
    lowering the spring loaded shaft and tine assembly until a portion thereof engages in a slot of the trigger and is held in a set position thereby.

2. The method as set forth in claim 1, wherein said step of pulling upwardly on the spring loaded shaft and tine assembly to move the second shaft upwardly compresses a spring that spring loads the second shaft of the shaft and tine assembly.

3. The method as set forth in claim 2, wherein the step of pushing the test tab rotates a release component that is operative to hold said trigger when the trap is in the set position, said trigger being operative to hold said spring loaded second shaft and said plurality of tines in the set position.

4. The method as set forth in claim 3, wherein a lower end of said first shaft has a trigger pad, said first shaft being operable to displace said release component in response to upward force applied to said trigger pad, displacement of said release component releasing said trigger, and said trigger when released being operable to release said spring loaded second shaft, said plurality of tines and said tine body moving rapidly downward when the spring loaded second shaft is released.

5. The method as set forth in claim 4, wherein said release component is operable to pivot in response to the upward force applied to the trigger pad causing upward movement of said first shaft, the pivoting of said release component releasing an upper end of said trigger to release said spring loaded second shaft.

6. The method as set forth in claim 1, wherein the portion of the spring loaded shaft and tine assembly comprises an edge of the tine body which is received within the trigger slot when the trap is in the set position.

7. The method as set forth in claim 1, wherein the step of pushing the test tab rotates a release component having an upper tab and a recess located within the housing, the upper tab engaging an upper end of the first shaft and an upper end of said trigger being held within said release component recess when the trap is in the set position.

8. A method of operating a mole trap that has a housing containing a trigger having a trigger slot and a release component, a first shaft and a second shaft generally parallel to and moveable with respect to said first shaft, a spring for spring loading the second shaft, a tine body and a plurality of tines affixed to a lower end of said second shaft, a trigger pad affixed to a lower end of said first shaft, the method comprising the steps of:
    placing the mole trap over a mole tunnel and pressing downwardly until the trigger pad contacts a ground surface forming a top of the mole tunnel;
    pulling upwardly on the second shaft to compress said spring and spring load said second shaft;
    pushing a test tab which protrudes through a slot of the mole trap housing; and
    lowering the spring loaded second shaft until a portion of the tine body engages in the trigger slot within the housing and is held in a set position thereby.

9. The method as set forth in claim 8, wherein the step of pushing the test tab rotates the release component to engage said release component with an upper end of the first shaft, an upper end of said trigger being held within a recess formed in said release component to hold said spring loaded second shaft and said plurality of tines in said set position.

10. The method as set forth in claim 9, wherein said first shaft is operable to displace said release component in response to upward force applied to said trigger pad, displacement of said release component releasing said trigger, and said trigger when released being operable to release said spring loaded second shaft, said second shaft, tine body and plurality of tines moving rapidly downward to drive the plurality of tines into the ground when the spring loaded second shaft is released.

11. The method as set forth in claim 8, wherein said release component is operative to hold said trigger in said set position, said trigger is operative to hold said spring loaded second shaft and said plurality of tines in said set position, said first shaft is operable to displace said release component in response to upward force applied to said trigger pad, and displacement of said release component releasing said trigger to release said spring loaded second shaft.

12. The method as set forth in claim 8, wherein said release component is operable to pivot in response to displacement of said first shaft, the pivoting of said release component displacing said trigger slot to release said spring loaded second shaft.

13. The method as set forth in claim 8, wherein said first shaft displaces said release component by sliding upwardly with respect to said second shaft to displace said release component.

14. A method of operating a mole trap comprising the steps of:
    providing a trap having a housing with at least one slot, a trigger with an upper end and a lower end with a trigger slot therein, a release component having a release slot and an upper tab and a test tab, a first shaft and a second shaft arranged parallel and adjacent one another, said first shaft connected to a trigger pad, said second shaft being spring loaded by a spring and moveable with respect to said first shaft, said spring loaded second shaft operably connected to a tine body having a plurality of tines;
    pushing the test tab downwardly in the at least one housing slot to pivot the release component clockwise and position the upper tab for engagement with an upper end of said first shaft;
    pulling upwardly on said second shaft and engaging the tine body with the trigger slot to hold the trap in a set position;
    said upper tab engaging the upper end of said first shaft and the upper end of the trigger being held within the release slot of the release component when the trap is in the set position.

15. The method as set forth in claim 14, wherein said release component is operative to hold said trigger in a set position, said trigger is operative to hold said spring loaded second shaft and said plurality of tines in said set position, said first shaft being operable to displace said release component in response to upward force applied to said first shaft, said release component being operable to release said trigger in response to the displacement, release of said trigger releasing said spring loaded second shaft.

16. The method as set forth in claim 15, wherein said release component is operable to pivot in response to the displacement by said first shaft, the pivoting of said release component displacing said release slot to release said trigger and said spring loaded second shaft.

17. The method as set forth in claim 14, wherein said first shaft displaces said release component by sliding upwardly with respect to said second shaft to displace said release component upper tab.

* * * * *